United States Patent
Olberding et al.

(10) Patent No.: US 6,752,474 B1
(45) Date of Patent: Jun. 22, 2004

(54) SYSTEM AND METHOD FOR MANAGING ELECTRIC BRAKES

(76) Inventors: Lynn M. Olberding, 1937 W. 24th St., Apt. 2A, Emporia, KS (US) 66801; Jonathan S. Gray, 136 W. First St., Garnett, KS (US) 66032

( * ) Notice: Subject to any disclaimer, the term of this patent is extended or adjusted under 35 U.S.C. 154(b) by 0 days.

(21) Appl. No.: 10/430,736

(22) Filed: May 6, 2003

(51) Int. Cl.[7] .................................................. B60T 7/20
(52) U.S. Cl. .................... 303/124; 188/3 R; 188/112 R
(58) Field of Search ........................... 188/3 H, 3 R, 188/112 A, 112 R; 303/7, 124

(56) References Cited

U.S. PATENT DOCUMENTS

| | | | |
|---|---|---|---|
| 6,499,814 B1 * | 12/2002 | Mixon | 303/124 |
| 6,619,759 B2 * | 9/2003 | Bradsen et al. | 303/7 |
| 6,685,281 B2 * | 2/2004 | MacGregor et al. | 303/123 |
| 2003/0168908 A1 * | 9/2003 | Robinson et al. | 303/7 |

* cited by examiner

Primary Examiner—Christopher P. Schwartz
(74) Attorney, Agent, or Firm—Hovey Williams LLP

(57) ABSTRACT

A system (10) and method for managing an electric brake (12) in a towed vehicle (14) during a breakaway event by managing current delivery to the electric brake (12) so as to maximize both effectiveness and efficiency. A power management module (24) delivers a first level of current for a first duration in order to stop the trailer (14), and delivers a second level of current in order to hold the trailer (14) in place. When provided with feedback, the module can actively adjust the first level of current to a maximum current while avoiding locking the electric brake (12), and to adjust the second level of current to a minimum current sufficient to hold the trailer (14). Additionally, front and rear electric brakes (12A,12B) can be managed differently or independently in order to achieve the most effective and efficient result.

33 Claims, 2 Drawing Sheets

SYSTEM AND METHOD FOR MANAGING ELECTRIC BRAKES

BACKGROUND OF THE INVENTION

1. Field of the Invention

The present invention relates broadly to systems and methods for managing electric brakes in trailers or other towed vehicles. More particularly, the present invention concerns a system and method for managing an electric brake in a trailer or other towed vehicle during a breakaway event, in which the towed vehicle separates from a towing vehicle, by controlling or managing current flow or delivery to the electric brake so as to maximize both effectiveness and efficiency.

2. Description of the Prior Art

It is necessary, during a breakaway event in which a trailer or other towed vehicle unexpectedly and unsafely separates of "breaks away" from a towing vehicle, to manage the operation and application of the trailer's electric brakes so as to safely stop the trailer. The trailer typically includes a first or front electric brake and a second or rear electric brake, operation of which is slaved to or otherwise controlled by the towing vehicle under normal conditions. During a breakaway event, however, separation of the vehicles interrupts communication between them, making an independent emergency braking system necessary in order to stop the trailer.

In the prior art, an emergency braking system typically includes a breakaway switch assembly and a trailer-mounted battery. The breakaway switch assembly includes a mechanical switch; a plunger to activate the mechanical switch; and a cable mechanically connecting the plunger to the towing vehicle. Separation of the trailer from the towing vehicle causes the cable to actuate the plunger which, in turn, causes the switch to electrically connect the battery directly to the first and second electric brakes. The battery then delivers maximum electric current to the electric brakes until either the switch is manually deactivated or reset or the battery is completely discharged. Under current Federal Department of Transportation regulations, the emergency braking system must provide for applying the electric brakes for a period of not less than fifteen minutes following activation.

Unfortunately, the prior art emergency braking system suffers from a number of serious limitations and disadvantages, including, for example, that delivering maximum current can reduce the effectiveness of the electric brakes by causing them to lock, thereby causing the wheels to skid and reducing traction. Furthermore, once the trailer has stopped, it becomes an unnecessary and inefficient waste of current to continue to deliver maximum current to the electric brakes for the remainder of the requisite fifteen minute period because maximum current is not necessary to hold or maintain the stopped trailer in place. Additionally, maximum power is typically delivered to both the first and second electric brakes for the entire fifteen minute period, even though both electric brakes are not necessary to hold the stopped trailer in place. Thus, in the prior art emergency braking system, maximum braking is applied throughout the requisite fifteen minute period, even though maximum braking may not provide maximum braking effectiveness while the trailer is moving and may not provide maximum power-use efficiency once the trailer has stopped. Those with ordinary skill in the electrical arts will appreciate that delivering maximum current to both the first and second electric brakes for fifteen continuous minutes requires that the trailer battery be relatively large, heavy, and expensive in order to have sufficient charge capacity.

Due to these problems and limitations in the prior art, an improved emergency braking system is needed that provides both improved effectiveness and improved efficiency.

SUMMARY OF THE INVENTION

The present invention overcomes the above-identified problems and limitations in the prior art with an emergency braking system and method for managing an electric brake in a trailer or other towed vehicle during a breakaway event by controlling or managing current flow or delivery to the electric brake so as to maximize both effectiveness and efficiency. Though described as being used with a trailer having both a first or front electric brake and a second or rear electric brake and a trailer-mounted battery, the system may be used in virtually any type of towed vehicle having any number and configuration of electric brakes or electric current sources.

In a preferred embodiment, the system broadly comprises a breakaway switch assembly and a power management module. The breakaway switch assembly provides a signal indicating occurrence of a breakaway event. In one possible implementation, the breakaway switch assembly may be substantially similar or identical in form to the breakaway switch assemblies of prior art emergency braking systems. Thus, the breakaway switch assembly may include a mechanical switch; a plunger to actuate the mechanical switch; and a cable mechanically connecting the plunger to the towing vehicle. As in prior art systems, separation of the towing and towed vehicles pulls the cable and removes the plunger to actuate the switch. In contrast to the prior art systems, however, actuation of the switch does not directly electrically connect the battery to the electric brakes to deliver maximum current in a substantially unrestricted and uncontrolled manner.

The power management module is interposed between the battery and the electric brakes and is adapted to manage or control current flow or delivery to the electric brakes so as to achieve both improved effectiveness and improved efficiency. More specifically, the power management module functions to deliver a first level of current for a first duration or initial portion of the fifteen minute period in order to stop the trailer, and then deliver a second level of current for a second duration or remaining portion of the fifteen minute period to hold or maintain the stopped trailer in place.

The first and second levels of current may be of substantially fixed, pre-established magnitudes and the first and second durations may be of substantially fixed, pre-established durations. Alternatively, the first and second levels of current may be of substantially variable magnitudes and the first and second durations may be of substantially variable lengths so as to allow for actively adapting the braking action to specific circumstances of the breakaway event. In order to facilitate such active adaptation, the system may include one or more sensors operable to determine and communicate to the power management module information related to, for example, whether the first or second electric brakes have locked or whether the trailer is moving. Thus, for example, the power management module might, based upon feedback from the sensors, determine and set the first level of current to a maximum current that will avoid locking the electric brakes, thereby increasing braking effectiveness, and determine and set the second level of current to a minimum current sufficient to hold the trailer in place, thereby increasing power-use efficiency.

Additional modifications may be made to improve or enhance management or control of the current levels and durations in order to further maximize effectiveness and efficiency. For example, the power management module could be configured to deliver current to the electric brakes using a ramp or other linear or nonlinear transfer function to further avoid locking the electric brakes. Additionally, the power management module could be configured to control the first and second electric brakes differently or independently so as to, for example, maximize braking during the first duration and minimize current drain during the second duration. Additionally, the power management module could be configured to allow a user to adjustment the current levels and durations to account for such situation-specific factors as, for example, trailer load or road conditions. Additionally, the power management module could be configured to determine battery charge and other battery conditions and then manage current levels and durations to achieve the best effect. Relatedly, the power management module can be configured to provide a warning of impending brake release once battery power drops below a predetermined threshold.

Thus, it will be appreciated that the system of the present invention provides a number of substantial advantages over prior art emergency braking systems, including, for example, substantially improving both effectiveness and efficiency. These and other important aspects of the present invention are more fully described in the section entitled DETAILED DESCRIPTION, below.

BRIEF DESCRIPTION OF THE DRAWINGS

A preferred embodiment of the present invention is described in detail below with reference to the attached drawing figures, wherein.

DETAILED DESCRIPTION OF THE PREFERRED EMBODIMENT

Figure 1:
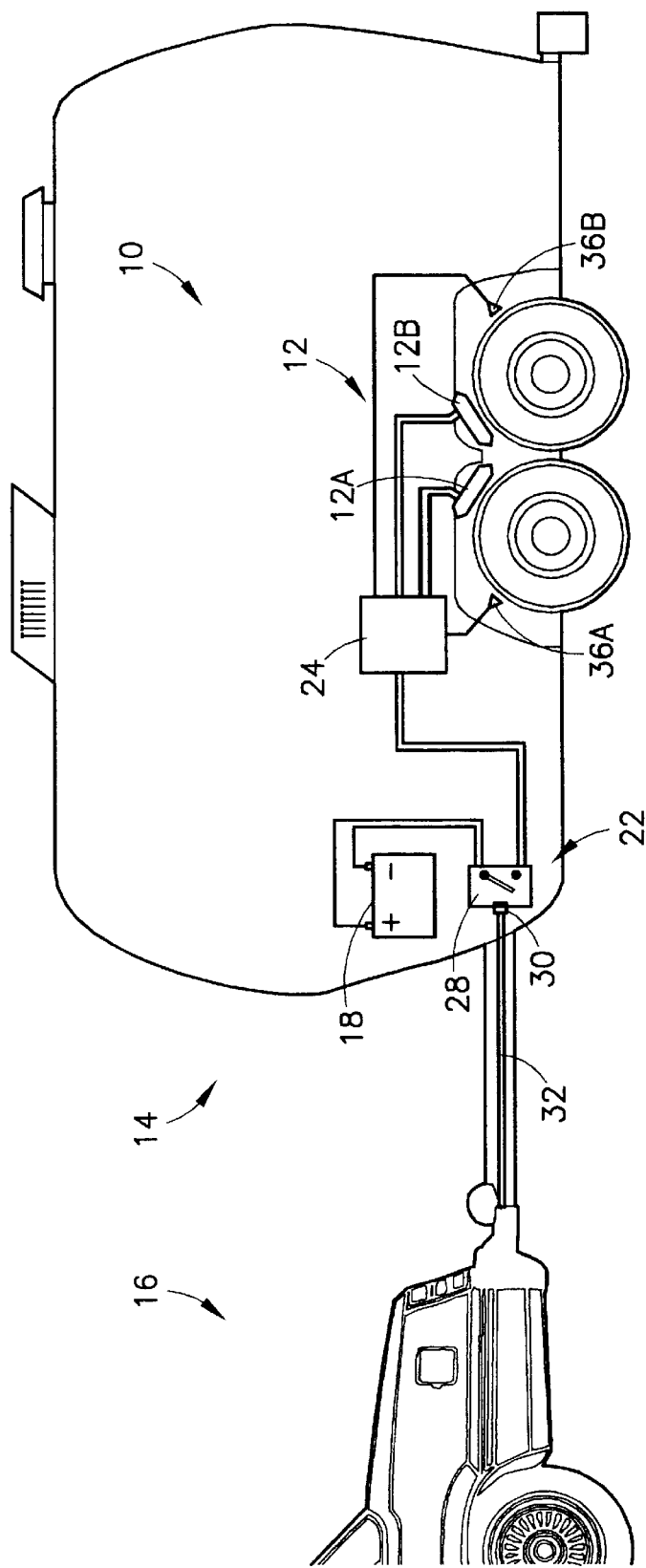
FIG. 1 is a schematic of a preferred embodiment of the emergency braking system of the present invention.

Referring to FIG. 1, an emergency braking system 10 for managing electric brakes is shown constructed in accordance with a preferred embodiment of the present invention. Broadly, the system 10 is adapted for managing an electric brake 12 in a trailer 14 or other towed vehicle during a breakaway event, in which the trailer 14 inadvertently and unsafely separates from a towing vehicle 16, by controlling or managing current flow or delivery to the electric brake 12 so as to maximize both the braking effectiveness and power-use efficiency.

As described herein, the trailer 14 includes both a first or front electric brake 12A and a second or rear electric brake 12B and a trailer-mounted battery 18. It will be appreciated, however, that the present invention may be used with virtually any type of towed vehicle having any number and configuration of electric brakes or electric current sources, and is not limited to any particular configuration.

In the preferred embodiment, the system 10 broadly comprises a breakaway switch assembly 22 and a power management module 24. The breakaway switch assembly 22 is adapted to provide a breakaway signal indicating that the trailer 14 has separated from the towing vehicle 16. In one possible implementation, the breakaway switch assembly 22 of the present invention may be substantially similar or identical in form to the breakaway switch assemblies of prior art emergency braking systems. Thus, the breakaway switch assembly 22 may include a mechanical switch 28; a plunger 30 to actuate the switch 28; and a cable 32 mechanically connecting the plunger 30 to the towing vehicle 16. As in the prior art systems, occurrence of a breakaway event results in separation of the vehicles 14,16, thereby pulling the cable 32, removing the plunger 30, and actuating the switch 28. In contrast to prior art systems, however, in the system 10 of the present invention actuation of the mechanical switch 28 does not directly electrically connect the battery 18 to the electric brakes 12A,12B to deliver maximum current in a substantially unrestricted and uncontrolled manner.

Alternative mechanisms for providing the breakaway signal and initiating efforts to safely stop the trailer include, for example, a mechanism whereby a continuous electric, infrared, radio-frequency, laser, or other non-mechanical signal is communicated, whether by physical or non-physical (wireless) connection, between the towing vehicle and the trailer, such a change in or loss of the signal indicates occurrence of the breakaway event.

The power management module 24 is interposed between the battery 18 and the electric brakes 12A, 12B and is adapted to manage or control current flow to the electric brakes 12A,12B so as to achieve both improved effectiveness and improved efficiency. More specifically, the power management module 24 functions to deliver a first level of current for a first duration or initial portion of the fifteen minute period in order to substantially stop the trailer (14), and then to deliver a second level of current for a second duration or remaining portion of the fifteen minute period to substantially hold or maintain the stopped trailer in place.

It will be appreciated that the power management module 24 can be designed as a stand-alone component or it can be incorporated into another system, such as, for example, a battery charger or command center. Similarly, the power management module 24 may be implemented in hardware, firmware, or software, or any combination thereof.

In a first possible implementation, the first and second levels of current are of substantially fixed, pre-established magnitudes and the first and second durations are of substantially fixed, pre-established lengths. Thus, for example, the power management module 24 might be configured to provide approximately between 20% and 100% of the maximum current available for a fixed period of approximately between ten seconds and ten minutes to stop the trailer, and to thereafter apply approximately between 1% and 80% of the maximum current to hold the trailer 14 in place for a fixed period equal to or greater than the remainder of the requisite fifteen minute period.

In a second possible implementation, the first and second levels of current are of substantially variable magnitudes and the first and second durations are of substantially variable lengths so as to allow for actively adapting the braking action to the specific circumstances of the breakaway event. In order to facilitate this implementation, the system 10 further includes one or more sensors 36A,36B operable to determine and communicate to the power management module 24 feedback information related to, for example, whether the first or second electric brakes 12A,12B have locked or whether the trailer has stopped moving. Thus, for example, the power management module 24 might, based upon information received from the sensors 36A,36B, determine and set the first level of current to a maximum current that will avoid locking the electric brakes 12, thereby improving braking effectiveness, and determine and set the second level of current as a minimum current sufficient to hold the trailer 14 in place, thereby improving power-use efficiency. It should be noted that, though the first level of current will typically be greater than the second level of current, under certain circumstances, such as, for example, on steeply-sloped roads or extremely wet conditions, the first level of current may be relatively low to avoid locking the electric brakes 12, and the second level of current may be relatively high to ensure that the trailer 14 will not move even if stopped on a steep grade. Similarly, the power management module 24 may end the initial duration only when the trailer 12 is determined, based upon information received from the sensors 36A,36B, to have substantially stopped moving.

It will be appreciated that the features of the described first and second implementations can be adapted, eliminated, combined, or otherwise changed to provide yet a third implementation that is more suitable or otherwise desirable for a particular use or application. Furthermore, additional modifications may be made to improve or enhance management or control of the current levels and durations in order to further maximize effectiveness and efficiency. For example, the power management module 24 could be configured to deliver current to the electric brakes 36 using a ramp, logarithmic, exponential, multiple step, or other linear or non-linear transfer function to further avoid locking the electric brakes 36.

Additionally, the power management module 24 can be configured to control the first electric brake 12A and the second electric brake 12B differently or independently, such as, for example, by delivering current to both the first and second electric brakes 12A, 12B to stop the trailer 14, thereby improving braking effectiveness, and thereafter delivering current to only one of the first or second electric brakes 12A,12B to hold the trailer 14 in place, thereby improving power-use efficiency.

Additionally, the power management module 24 could be configured to allow a user to substantially adjust the current levels and durations to account for such situation-specific factors as, for example, trailer load or road conditions. Such adjustment may take the form of, for example, setting bias values below which the current levels or durations will not be set by the power management module 24.

Additionally, the power management module 24 could be configured to, prior to occurrence of a breakaway event, receive information from a master brake control system located in the towing vehicle 16 regarding ideal current levels to achieve maximum traction without locking the electric brakes 12, and then apply those current levels following the breakaway event, thereby further improving braking effectiveness.

Additionally, the power management module 24 could be configured to determine battery charge and other battery conditions and then manage current levels and durations to achieve the best or most advantageous effect. This might include, for example, the power management module 24 adapting delivery of current in light of the battery's actual condition, rather than basing current levels and durations solely on ideal battery conditions. If, for example, current levels and durations are based on the battery 18 having a 100% charge when, in fact, it has only a 40% charge due to age, damage, or operating conditions, then an unsafe condition could occur wherein the system 10 is not able to deliver current for the entire requisite fifteen minute period. Relatedly, the power management module 24 could be configured to provide an audible or visual warning of impending brake release or "failure" once battery charge drops below a pre-established threshold.

Figure 2:
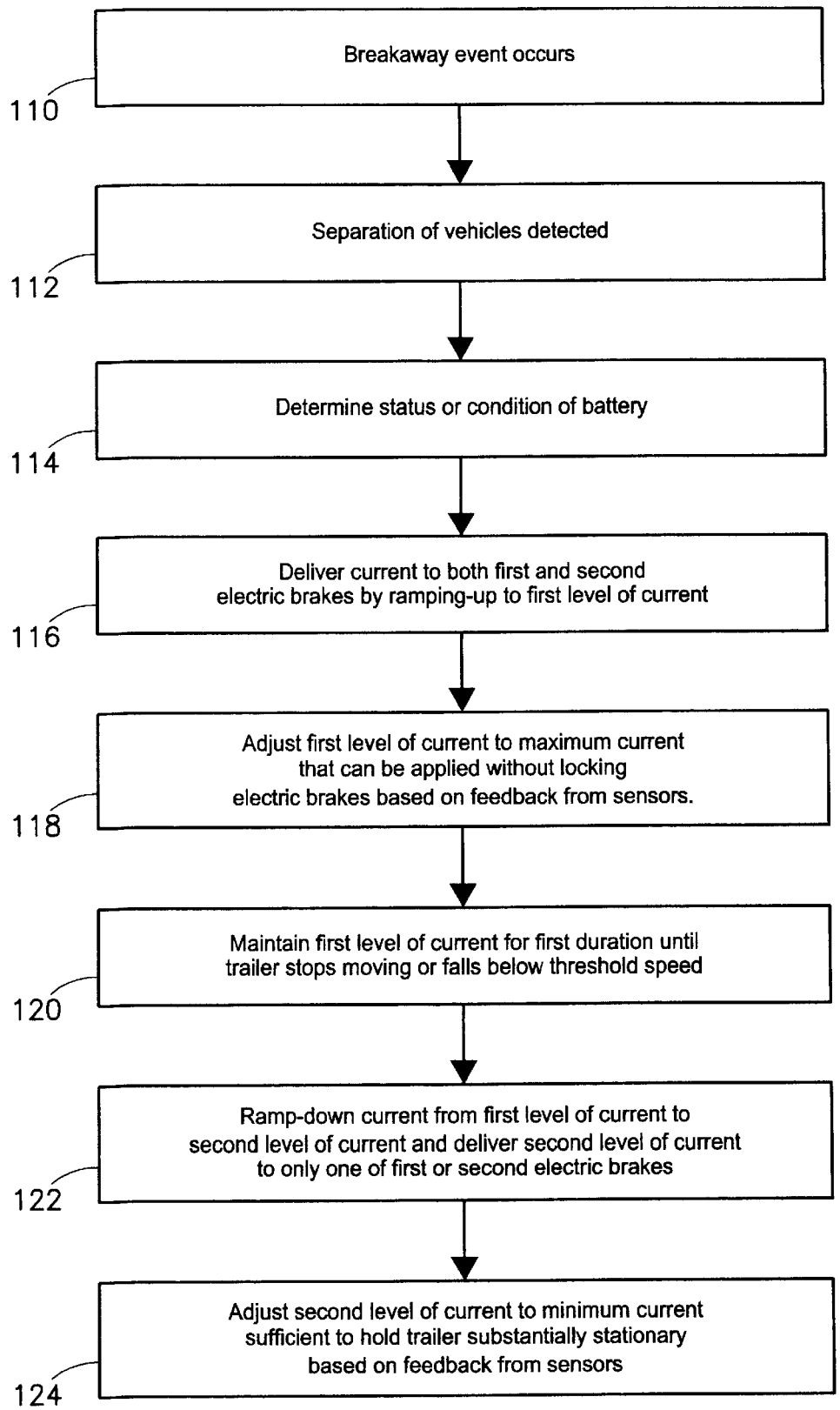
FIG. 2 is a flowchart of steps involved in operation of the emergency braking system shown in FIG. 1.

In exemplary use and operation, referring also to FIG. 2, the system 10 may functions as follows. A breakaway event occurs in which the moving trailer 14 separates inadvertently and unsafely from the moving towing vehicle 16, as depicted in box 110. This separation is detected by the system 10 when the cable 32 pulls the plunger 30 from the switch 28, thereby closing the switch 28 and electrically connecting the battery 18 to the power management module 24, as depicted in box 112. The power management module 24 receives and processes information regarding a status or condition of the battery 18 such as, for example, actual charge, as depicted in box 114. The power management module 24 then begins to deliver current to both the first and second electric brakes 12A,12B, wherein current delivery is ramped-up from approximately zero current to a first level of current, as depicted in box 116. The power management module 24 receives and processes information from the sensors 36A,36B regarding a status (e.g., locked or not locked) of the electric brakes 12 and a status of the trailer 14 (e.g., moving or not moving), and uses this feedback from the sensors 36A,36B to adjust the first level of current to the maximum current that can be applied without locking the electric brakes 12 or draining the battery 18 too quickly, as depicted in box 118. The first level of current is maintained for a first duration, with the first duration lasting until the trailer 14 stops moving or falls below a threshold speed as determined from the information provided by the sensors 36A,36B, as depicted in box 120.

The power management module 24 then ramps-down current delivery from the first level of current to a second level of current, as depicted in box 122. The power management module 24 continues to receive and process information from the sensors 36A,36B regarding the status of the trailer 14 (e.g., moving or not moving), and uses this feedback from the sensors 36A,36B to adjust the second level of current to the minimum current that is sufficient to hold the trailer 14 in place, as depicted in box 124. The second level of current is applied only to one of the first electric brake 12A or the second electric brake 12B, and is maintained for a second duration which is at least equal to fifteen minutes minus the first duration but preferably lasts until the switch 28 is reset or sufficient current is no longer available from the battery 18.

From the preceding description, it will be appreciated that the system of the present invention provides a number of substantial advantages over prior art brake systems to result in both improved brake effectiveness and improved power-use efficiency. This allows for using a smaller, lighter, less expensive battery while still achieving the same or better braking performance, or, alternatively, allows for using a conventionally-sized battery to provide further improved braking performance (e.g., longer braking than the federally-mandated fifteen minutes, thereby maintaining the trailer in place for a longer period of time) or to support other powered features.

Having thus described the preferred embodiment of the invention, what is claimed as new and desired to be protected by Letters Patent includes the following:

1. A system for controlling an electric brake of a towed vehicle during a breakaway event in which the towed vehicle separates from a towing vehicle, the system comprising:

a breakaway switch assembly adapted to connect a battery upon occurrence of the breakaway event; and a power management module interposed between the battery and the electric brake and configured to control a flow of current from the battery to the electric brake by delivering a first level of current for a first duration in order to substantially stop the towed vehicle and by delivering a second level of current for at least a second duration in order to hold the towed vehicle substantially stationary.

2. The system as set forth in claim 1, wherein the first level of current, the first duration, and the second level of current are substantially pre-set and fixed.

3. The system as set forth in claim 1, wherein the first level of current and the second level of current are substantially adjustable by a user prior to occurrence of the breakaway event.

4. The system as set forth in claim 1, wherein the first level of current, the first duration, and the second level of current are substantially changeable by the power management module during the breakaway event.

5. The system as set forth in claim 1, wherein the first level of current is approximately between 20% and 100% of a maximum current.

6. The system as set forth in claim 1, wherein the first level of current is approximately a maximum level of current that avoids locking the electric brake.

7. The system as set forth in claim 1, wherein the second level of current is approximately between 1% and 80% of a maximum current.

8. The system as set forth in claim 1, wherein the second level of current is approximately a minimum level of current sufficient to hold the towed vehicle substantially stationary.

9. The system as set forth in claim 1, wherein the second duration is at least equal in length to fifteen minutes minus the first duration.

10. The system as set forth in claim 1, wherein the first level of current is delivered using a transfer function selected from the group consisting of: ramp functions, logarithmic functions, exponential functions, multiple step functions, non-linear functions.

11. The system as set forth in claim 1, wherein the electric brake includes a first electric brake and a second electric brake and wherein the power management module is adapted to deliver the first level of current to both the first electric brake and the second electric brake in order to substantially stop the towed vehicle, and to deliver the second level of current to only one of the first electric brake and the second electric brake in order to hold the towed vehicle substantially stationary.

12. The system as set forth in claim 1, wherein the power management module is adapted to determine an available charge of the battery and to base at least one of the first level of current, the first duration, the second level of current, and the second duration on the available charge.

13. The system as set forth in claim 1, further including a sensor adapted to sense and provide feedback to the power management module on a condition of the electric brake relating to locking, wherein the power management module is adapted to adjust the first level of current based upon the feedback.

14. The system as set forth in claim 1, further including a sensor adapted to sense and provide feedback to the power management module on a condition of the towed vehicle relating to movement, wherein the power management module is adapted to end the first duration and adjust the second level of current based upon the feedback.

15. A system for controlling an electric brake of a towed vehicle during a breakaway event in which the towed vehicle separates from a towing vehicle, the system comprising:

a breakaway switch assembly adapted to connect a battery upon occurrence of the breakaway event; and a power management module interposed between the battery and the electric brake and configured to control a flow of current from the battery to the electric brake by delivering a first level of current for a first duration in order to substantially stop the towed vehicle and by delivering a second level of current for at least a second duration in order to hold the towed vehicle substantially stationary;

a first sensor adapted to sense and provide feedback to the power management module on a condition of the electric brake relating to locking, wherein the power management module is adapted to adjust the first level of current based upon the feedback; and a second sensor adapted to sense and provide feedback to the power management module on a condition of the towed vehicle relating to movement, wherein the power management module is adapted to end the first duration and adjust the second level of current based upon the feedback.

16. A system for controlling a first electric brake and a second electric brake of a towed vehicle during a breakaway event in which the towed vehicle separates from a towing vehicle, the system comprising:

a breakaway switch assembly adapted to connect a battery upon occurrence of the breakaway event; and a power management module interposed between the battery and the electric brake and configured to control a flow of current from the battery to the electric brake by delivering a first level of current for a first duration to the first electric brake and the second electric brake in order to substantially stop the towed vehicle, and by delivering a second level of current for at least a second duration to only one of the first electric brake and the second electric brake in order to hold the towed vehicle substantially stationary.

17. A method of controlling an electric brake of a towed vehicle during a breakaway event in which the towed vehicle separates from a towing vehicle, the system comprising:

(a) delivering a first level of current to the electric brake for a first duration in order to substantially stop the towed vehicle; and (b) delivering a second level of current to the electric brake for at least a second duration in order to hold the towed vehicle substantially stationary.

18. The method as set forth in claim 17, wherein the first level of current, the first duration, and the second level of current are substantially pre-set and fixed.

19. The method as set forth in claim 17, wherein the first level of current, the first duration, and the second level of current are substantially changeable during the breakaway event.

20. The method as set forth in claim 17, wherein the first level of current is approximately between 20% and 100% of a maximum current.

21. The method as set forth in claim 17, wherein the first level of current is approximately a maximum level of current that avoids locking the electric brake.

22. The method as set forth in claim 17, wherein the first level of current is based upon information received from a master brake control system located in the towing vehicle regarding an ideal current level to achieve maximum traction without locking the electric brake.

23. The method as set forth in claim 17, wherein the second level of current is approximately between 1% and 80% of a maximum current.

24. The method as set forth in claim 17, wherein the second level of current is approximately a minimum level of current sufficient to hold the towed vehicle substantially stationary.

25. The method as set forth in claim 17, wherein the second duration is at least equal in length to fifteen minutes minus the first duration.

26. The method as set forth in claim 17, wherein the first level of current is delivered using a transfer function selected from the group consisting of: ramp functions, logarithmic functions, exponential functions, multiple step functions, nonlinear functions.

27. The method as set forth in claim 17, wherein the electric brake includes a first electric brake and a second electric brake and wherein the first level of current is delivered to both the first electric brake and the second electric brake in order to substantially stop the towed vehicle, and the second level of current is delivered to only one of the first electric brake and the second electric brake in order to hold the towed vehicle substantially stationary.

28. The method as set forth in claim 17, further including the step of allowing a user to substantially adjust the first level of current and the second level of current prior to occurrence of the breakaway event.

29. The method as set forth in claim 17, further including the step of determining an available charge and basing at least one of the first level of current, the first duration, the second level of current, and the second duration on the available charge.

30. The method as set forth in claim 17, further including the step of adjusting the first level of current during the first duration to a maximum level while avoiding locking the electric brake.

31. The method as set forth in claim 17, further including the steps of adjusting the second level of current to a minimum level while substantially preventing movement of the towed vehicle.

32. A method of controlling an electric brake of a towed vehicle during a breakaway event in which the towed vehicle separates from a towing vehicle, the system comprising:

(a) delivering a first level of current to the electric brake for a first duration in order to substantially stop the towed vehicle;

(b) adjusting the first level of current during the first duration to a maximum level while avoiding locking the electric brake;

(c) delivering a second level of current to the electric brake in order to hold the towed vehicle substantially stationary; and (d) adjusting the second level of current to a minimum level while substantially preventing movement of the towed vehicle.

33. A method of controlling a first electric brake and a second electric brake of a towed vehicle during a breakaway event in which the towed vehicle separates from a towing vehicle, the system comprising:

(a) delivering, substantially upon occurrence of the breakaway event, a first level of current to both the first electric brake and the second electric brake for a first duration in order to substantially stop the towed vehicle; and (b) delivering a second level of current to only one of the first electric brake and the second electric brake in order to hold the towed vehicle substantially stationary.

* * * * *